(12) United States Patent
Godfrey et al.

(10) Patent No.: US 9,511,416 B2
(45) Date of Patent: Dec. 6, 2016

(54) FEED DEVICES FOR SWAGABLE LOCKBOLT COLLARS

(71) Applicant: GAGE BILT, INC., Clinton Township, MI (US)

(72) Inventors: Bruce T. Godfrey, Royal Oak, MI (US); Brian H. Leigh, Macomb, MI (US); Tony P. Potts, Warren, MI (US)

(73) Assignee: Gage Bilt, Inc., Clinton Township, MI (US)

( * ) Notice: Subject to any disclaimer, the term of this patent is extended or adjusted under 35 U.S.C. 154(b) by 22 days.

(21) Appl. No.: 14/335,145

(22) Filed: Jul. 18, 2014

(65) Prior Publication Data

US 2015/0184689 A1    Jul. 2, 2015

Related U.S. Application Data

(63) Continuation-in-part of application No. 13/744,814, filed on Jan. 18, 2013.

(51) Int. Cl.
*B21J 15/32* (2006.01)
*B21J 15/38* (2006.01)
(Continued)

(52) U.S. Cl.
CPC .............. *B21J 15/326* (2013.01); *B21J 15/022* (2013.01); *B21J 15/105* (2013.01); *B21J 15/32* (2013.01); *B21J 15/38* (2013.01); *B23P 19/003* (2013.01); *B23P 19/006* (2013.01); *B23P 19/005* (2013.01); *B25B 23/06* (2013.01); *F16B 19/05* (2013.01); *F16B 39/284* (2013.01); *Y10T 29/49925* (2015.01); *Y10T 29/49948* (2015.01); *Y10T 29/49956* (2015.01); *Y10T 29/535* (2015.01); *Y10T 29/5373* (2015.01); *Y10T 29/53496* (2015.01)

(58) Field of Classification Search
CPC ...... B21J 15/022; B21J 15/105; B21J 15/12; B21J 15/32; B21J 15/326; B21J 15/38; B23P 19/001; B23P 19/002; B23P 19/003; B23P 19/004; B23P 19/005; B23P 19/006; B23P 19/06; B23P 19/08; B25B 23/06; B25B 28/00; B65G 51/02; F16B 19/05; F16B 39/28; F16B 39/284; Y10T 29/49948; Y10T 29/4995; Y10T 29/49952; Y10T 29/49954; Y10T 29/49956; Y10T 29/49957; Y10T 29/53478; Y10T 29/53487; Y10T 29/53496; Y10T 29/535; Y10T 29/53513; Y10T 29/53522

See application file for complete search history.

(56) References Cited

U.S. PATENT DOCUMENTS 4,417,688 A    11/1983  Schnaibel et al.
4,674,367 A *  6/1987  Aab ..................... B25B 21/007
                                                 81/433

(Continued)

*Primary Examiner* — Christopher Besler
*Assistant Examiner* — Matthew P Travers
(74) *Attorney, Agent, or Firm* — Young Basile Hanlon & MacFarlane, P.C.

(57) ABSTRACT

An air-driven device for feeding lockbolt collars to a presentation position for installation on lockbolts, one at a time, including a hand-held grip with a curved presentation piece on the top end and a flared bottom end with an air input. The grip is designed to receive in an attached relationship a cylindrical collar cartridge with a spiral cartridge passage for holding a large number of collars. An air supply can be connected into an inlet in the flared collar of the grip and this inlet is in communication with an air passage that extends downwardly through the cartridge to a point where it enters into the spiral passage so as to urge collars upwardly through the spiral passage into the grip body and from there to the presentation position.

1 Claim, 11 Drawing Sheets

(51) Int. Cl.
*B23P 19/00* (2006.01)
*B21J 15/10* (2006.01)
*B21J 15/02* (2006.01)
*B25B 23/06* (2006.01)
*F16B 19/05* (2006.01)
*F16B 39/284* (2006.01)

(56) References Cited

U.S. PATENT DOCUMENTS

| | | |
|---|---|---|
| 4,852,376 A | 8/1989 | Suhov |
| 5,142,774 A | 9/1992 | Jeffery |
| 5,143,216 A * | 9/1992 | Aurtoi ............... B21J 15/32 206/303 |
| 5,167,327 A | 12/1992 | Mondello |
| 5,385,434 A | 1/1995 | Quinn et al. |
| 5,490,311 A | 2/1996 | Rosier |
| 5,697,521 A | 12/1997 | Dixon |
| 6,253,448 B1 | 7/2001 | Zieve et al. |
| 6,907,648 B2 | 6/2005 | Eldessouky |
| 2011/0252626 A1 | 10/2011 | Williams |
| 2011/0289769 A1 | 12/2011 | Skolaude |
| 2013/0247890 A1 | 9/2013 | Gilley |
| 2014/0201972 A1 | 7/2014 | Butvin et al. |

* cited by examiner

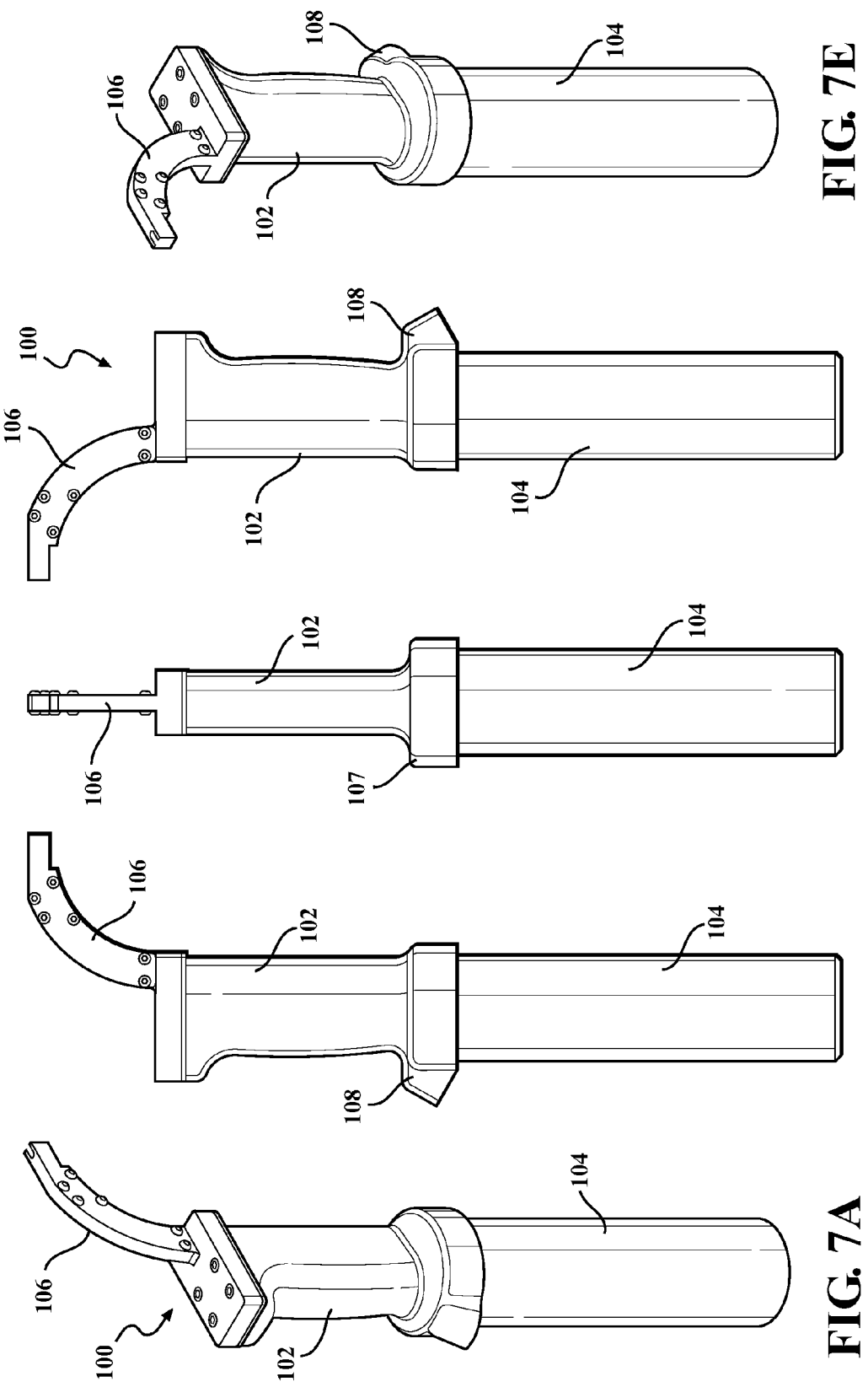

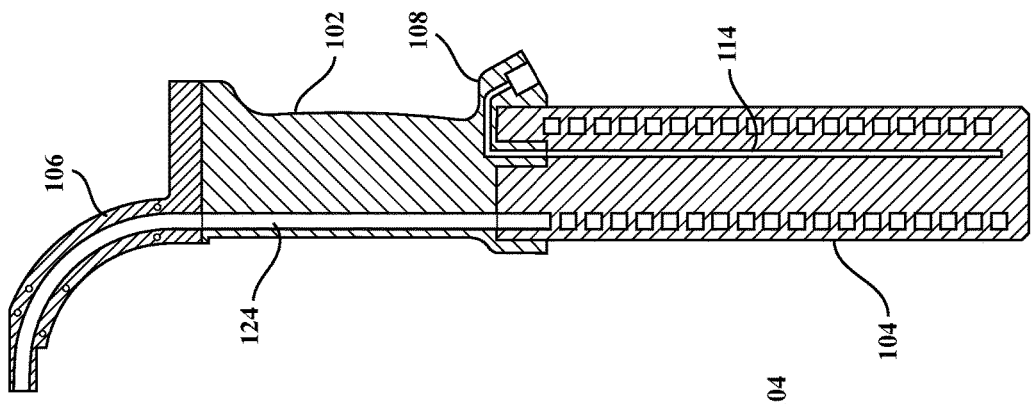
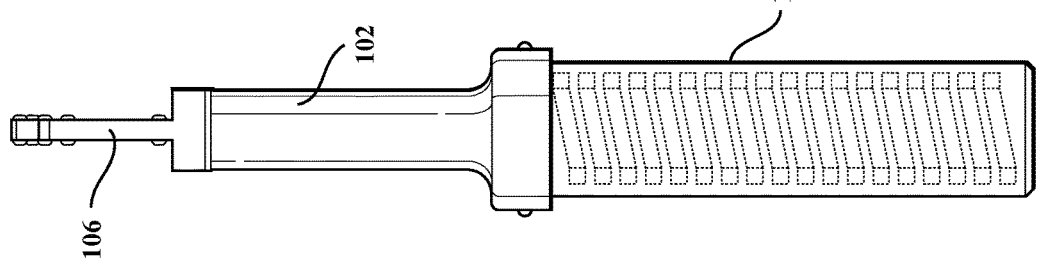
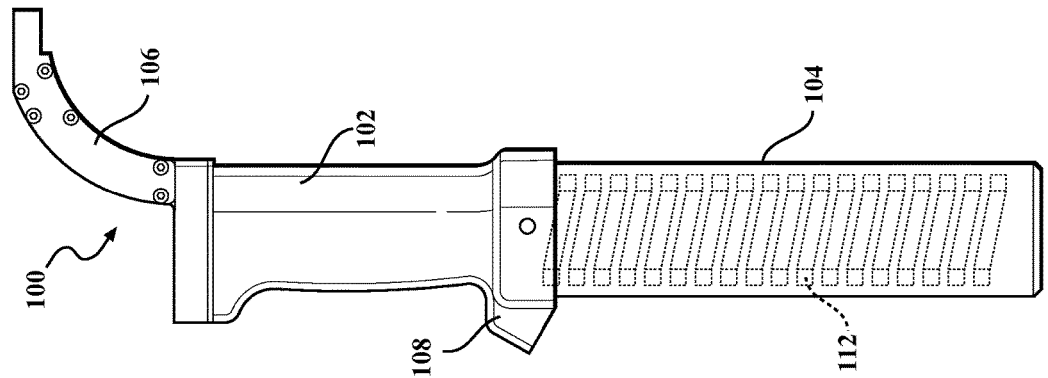
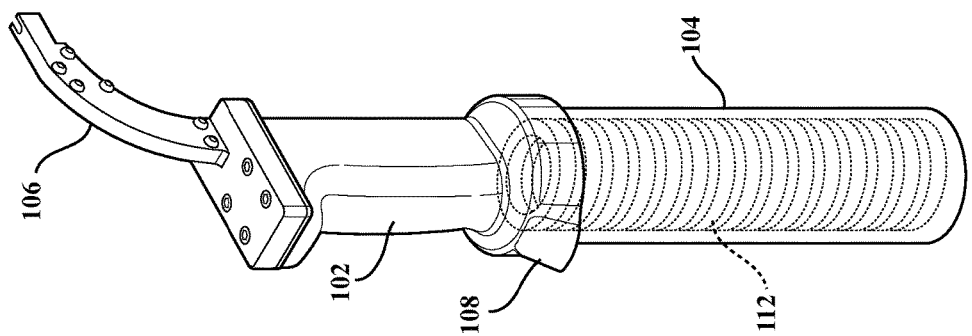

FEED DEVICES FOR SWAGABLE LOCKBOLT COLLARS

CROSS-REFERENCE TO RELATED APPLICATION

This application is a continuation-in-part of the co-pending U.S. patent application Ser. No. 13/744,814 filed Jan. 18, 2013. The entire contents of applications Ser. No. 13/744,814 are incorporated herein by reference.

FIELD OF THE INVENTION

The invention relates generally to the installation of lockbolt fasteners having shanks adapted to receive swagable collars and more particularly to devices for conveniently presenting collars for placement on lockbolt shanks such that a swaging tool can thereafter be applied to secure the collars to the lockbolt shanks. In addition, a device is provided for collecting lockbolt pintails broken off by the swaging tool.

BACKGROUND OF THE INVENTION

Lockbolts of the type having grooved or threaded shanks adapted to receive a swagable metal collar have been known and in widespread use since at least as early as the application date of U.S. Pat. No. 2,521,048 incorporated by reference into expired U.S. Pat. No. 4,852,736 assigned to Huck Manufacturing Company. A typical lockbolt comprises a head and a shank extending from the head. In some cases, the shank is divided into two axially-spaced portions separated by a fracture groove. The portion closer to the head is provided with convolutions or grooves, onto which a collar is swaged. The shank portion farther from the head is called a "pintail" and is broken off by the swaging tool.

In practice, lockbolts are placed in holes already formed in the work pieces to be joined. Thereafter, a worker assigned to finish the installation of the lockbolts places collars on one or more lockbolt shanks and then applies the swaging tool to set (swage) the collars and, where applicable, break off the pintail. This is done lockbolt-by-lockbolt in sequence. A worker typically swages collars in groups of, for example, 6 to 12 collars, and then rests his or her arms by lowering the swaging tool and placing collars on another set of lockbolts. We refer to the swaging of a group of lockbolt collars in one tool-handling time as a "cycle", it being understood that most fastening jobs involve a number of such cycles.

As a practical matter, there are several problems that can crop up in the field. The first arises out of the fact that the article being constructed is sometimes above the worker's head, and the lockbolt shanks may be vertical. Even if a sticky substance like rubberized cement is used to hold the unswaged collars in place, the swaging process may still cause collars to fall off of the lockbolt shanks before they are swaged. In aircraft applications, dropped collars must be scrapped. This not only reduces the efficiency of the lockbolt installation process, but also requires a worker to prevent dropped collars from becoming "foreign object debris" (FOD).

Another problem which often arises in the field is the collection and disposal of lockbolt shank pintails broken off during the swaging step. The typical tool simply ejects pintails without any kind of organization or collection function. Ejected pintails often collect on or around the workpiece or fall on the floor where they present a safety hazard. This is another potential source of FOD. Moreover, normal collection further reduces lockbolt installation efficiency.

SUMMARY OF THE INVENTION

A first aspect of the invention subject matter disclosed herein is a handheld collar feeder tool capable of presenting swagable lockbolt collars in such a way as easily place them on a shank after which they are swaged by a tool. In a first illustrative embodiment hereinafter described in detail, the collar feeder comprises a handheld tool with a trigger that allows an operator to load a number of collars from a large capacity magazine into a feeder tool queue ready to be fitted into lockbolts. A worker performs the loading function by transferring collars from the magazine into the tool queue using a transfer mechanism built into the feeder tool. The tool is configured to present each collar in the loaded queue in such a way as to allow the worker to place the collar onto a lockbolt shank. The worker then fits a swaging tool onto the collar and swages it onto the lockbolt. The next collar in the loaded queue, if there is one, then moves into the presentation position. The worker completes a cycle and reloads the queue.

In the embodiments described herein, the tool is configured such that the fully-loaded queue holds about 5-15 collars, the number that experience shows a worker can comfortably install in one cycle. The worker can reload the queue, fully or partially, between each swaging cycle simply by activating the tool trigger. These numbers are given by way of example only.

In the first embodiment described and illustrated herein, the magazine queue and the feeder tool queue are offset from one another in the queue. Collars are transferred, one at a time, from the top of the magazine to the tool queue by repeatedly depressing a trigger to toggle a slide. Because both the magazine and the handheld tool are connected to a source of pressurized air, the collars in the main magazine are constantly being urged toward the slide mechanism while the collars transferred to the tool queue are constantly being urged toward the presentation end of the tool. The presentation end of the feeder tool can be configured to suit the particular work in progress. Air pressure controls may be provided.

In a second embodiment of the invention hereinafter described, a collar presentation device comprises a cartridge with a spiral-shaped internal collar passage, and a grip which fastens to the cartridge in such a way as to (a) receive collars from the cartridge, and (b) connect a supply of pressurized air to the cartridge to urge collars upwardly through the spiral passage and into the grip where they enter a curved feeder queue that holds the collars for placement onto a lockbolt shank. The cartridge and grip may be easily connected and disconnected by any suitable means, one of which is shown and described below.

According to a second aspect of the invention, means are provided for systematically collecting and disposing of pintails broken off from lockbolt fasteners on which collars are swaged. In accordance with this aspect of the invention, a swaging/pulling tool that normally ejects broken-off pintails is provided with a conduit which receives ejected pintails, one at a time, and delivers the pintails by vacuum to a container for pintails in an organized and safe fashion in the illustrated embodiment, a conduit runs from the swaging tool to and through a vacuum generator that provides for the movement of pintails from swaging tool to the container.

Other aspects of the invention disclosed herein comprise methods of using the aforementioned collar feed and pintail collection devices, either together as part of a system, or individually.

Still further advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF SUMMARY OF THE DRAWINGS

The description herein makes reference to the accompanying drawings wherein like reference numerals refer to like parts throughout the several views and wherein:

FIGS. 7A through 7E are perspective views of a second embodiment of the feeder invention showing, in all cases, the cartridge and grip connected to each other but with the air supply unconnected;

FIGS. 8A through 8D are perspective views of the second feeder embodiment with views A-C "X-rayed" to show internal details, and view D as a conventional section.

DETAILED DESCRIPTION OF THE ILLUSTRATIVE EMBODIMENTS

Figure 1:
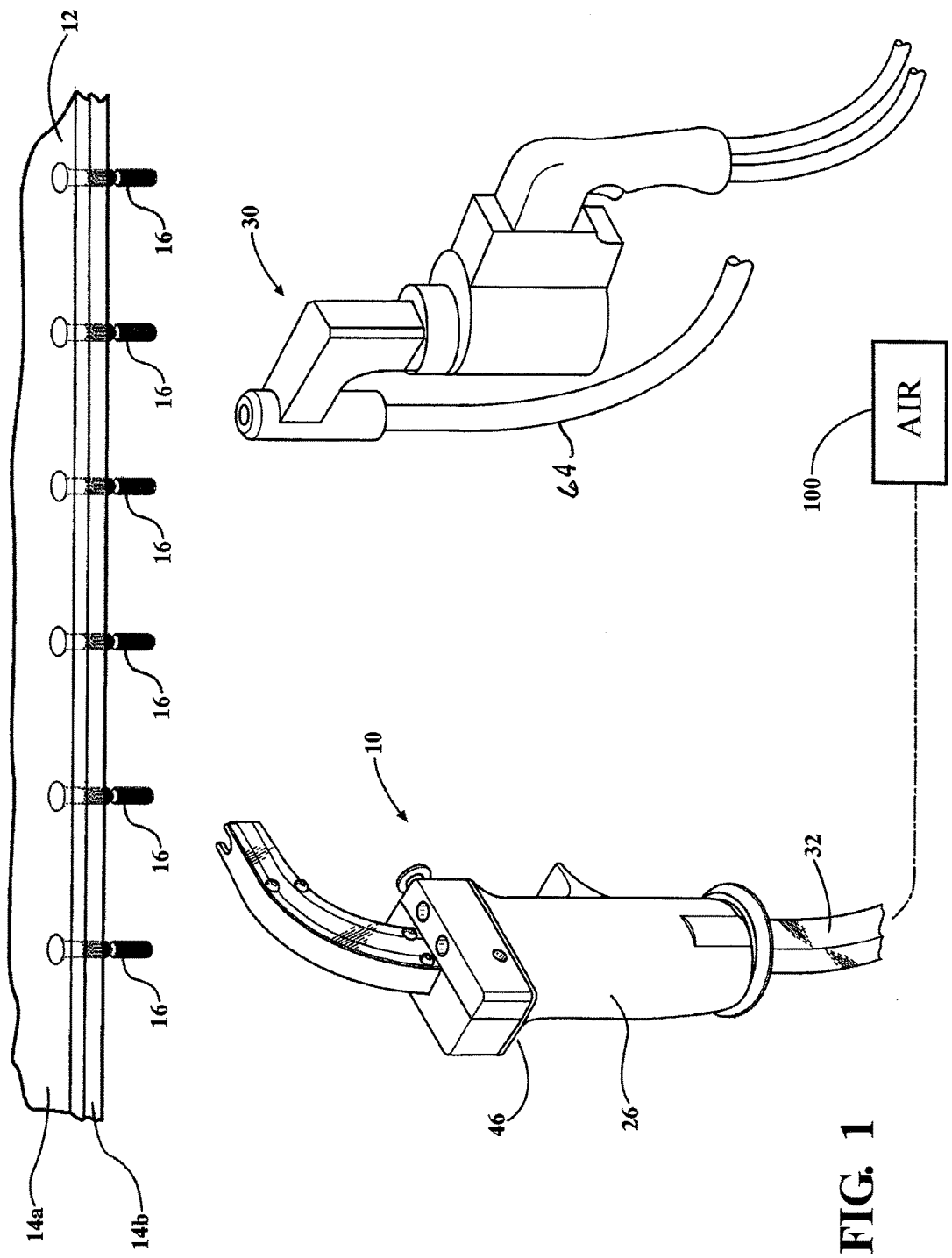
FIG. 1 is a schematic diagram of a lockbolt installation system including a first collar feeder and a swaging tool for installing collars on the shanks of vertically oriented lockbolts in a workpiece.

Referring to the drawings, and particularly to FIG. 1, there is shown a two-part system for installing lockbolts in a workpiece 12 that, in this case, is shown simply as two sheets 14a and 14b of metal to be fastened together. The sheets may, for example, be aluminum sheets. The sheets are joined together by lockbolts 16 of the "pintail" type. The system for installing lockbolts 16 comprises a feeder tool 10 for placing swagable metal collars 28 (FIG. 2) onto the exposed shanks of lockbolts 16, and a swaging tool 30 having a pintail collection feature including a vacuum conduit 64 further described herein with reference to FIG. 6. While the system of FIG. 1 works to best advantage when both tools 10 and 30 are present, tool 10 may be used with any swaging tool, and the pintail collection system associated with tool 30 may be used without the feeder tool 10.

Tools 10 and 30 are provided with pressurized air by a regulated supply 100 that may be part of a power unit such as the GB904V available from Gage Bilt, Inc. of Clinton Township, Mich.

Figure 5:
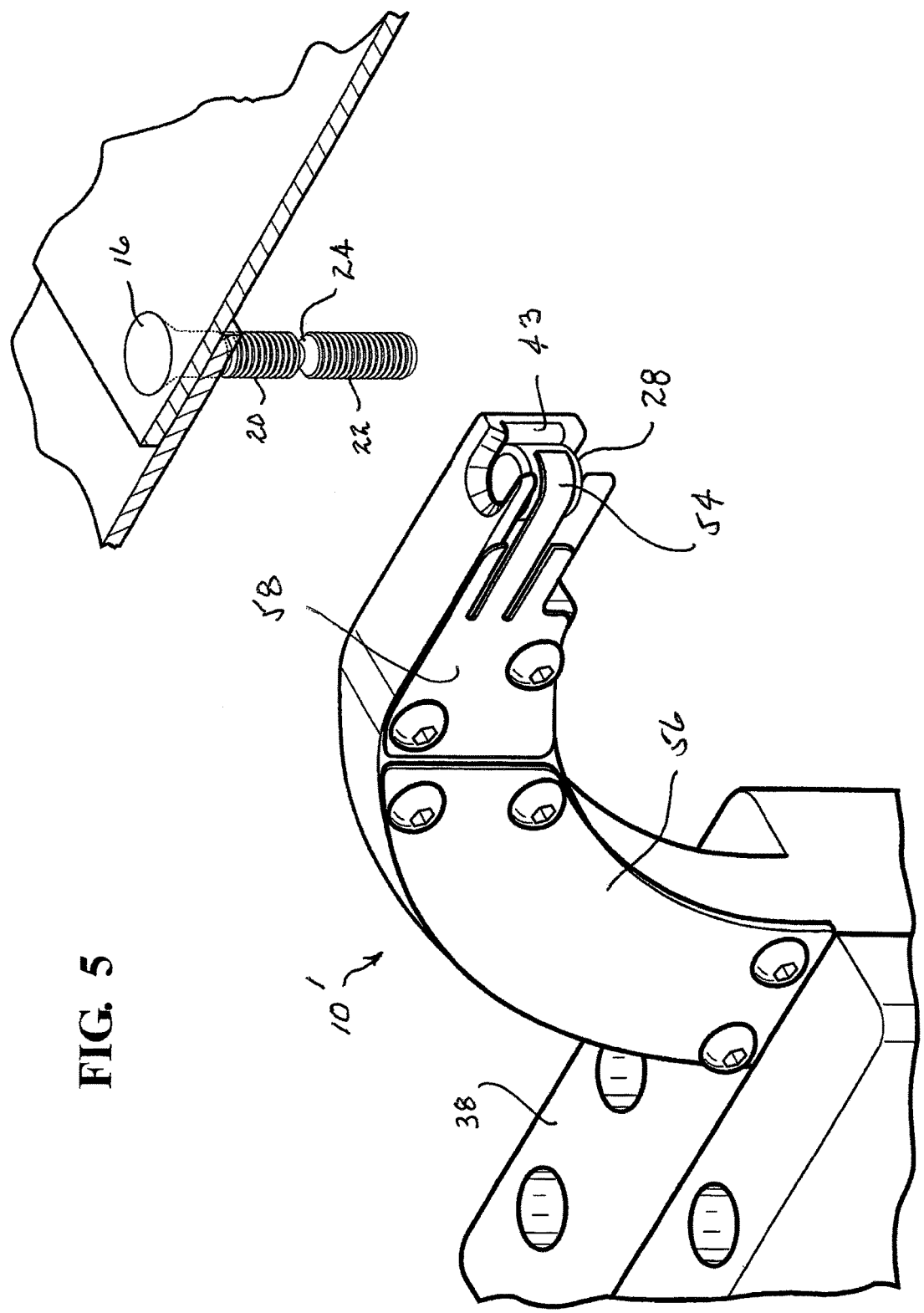
FIG. 5 is a detailed view of the feeder tool of FIG. 2 and a lockbolt ready to receive a collar.

As shown in FIG. 5, each lockbolt 16 comprises a shank divided into two axially contiguous grooved portions 20 and 22; the grooves may be annular or helical. The grooves on the upper portion 20 receive material from metal collars 28 that are swaged onto the upper shanks by tool 30. The grooves on the lower shank portion 22 provide grip for the puller section of the tool 30. Between the two shank portions 20, 22 is a fracture groove 24 that causes the lower shank portion 22 to break off as part of the installation process. The material of the collars 28 is softer than the material of the lockbolt shank such that the swaging tool 30 deforms the collar radially inwardly into the grooves on shank portion 20, locking the collar 28 to the shank of the lockbolt 16 and serving effectively as a non-removable nut. The tool 30 performs the function of pulling on the lockbolt shank while swaging the collar, thus urging the two layers 14a, 14b of sheet material together. The pulling step ultimately breaks the lower or "pintail" portion 22 of the shank off at groove 24.

As shown in FIG. 1, the lockbolts 16 are typically arranged on the work 10 in rows with spacings that can vary considerably but may, in a typical situation, be approximately two to four inches apart. Although only six lockbolts 16 are shown in FIG. 1, it is to be understood that the normal work situation may involve hundreds of lockbolts to be installed.

Figure 2:
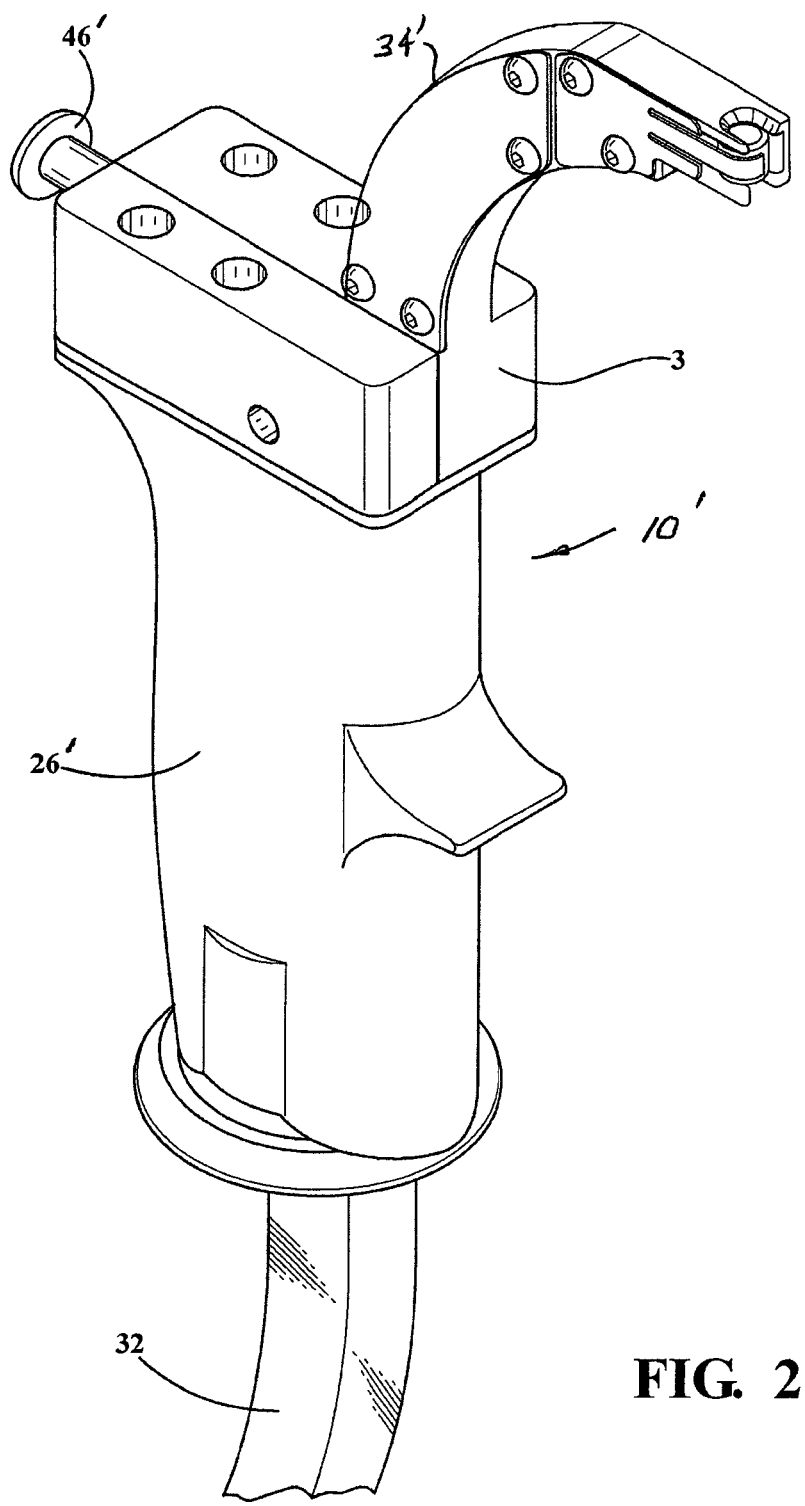
FIG. 2 is a perspective section of an alternative collar feeder also having a curved end piece for holding a group of collars in a queue and presenting them to a lockbolt shank.

Referring to FIGS. 2 through 5, two somewhat different feeder tools are shown. Tool 10 has a front rear-mounted, index finger-operated trigger while tool 10' has a rear, thumb-finger-operated trigger. The difference in trigger position gives rise to other internal differences as hereinafter explained. The overall functions of tools 10 and 10' are, however, very much the same: they receive collars 28 from an attached magazine 32 to fill a queue within a curved end piece for placement on lockbolts. In FIGS. 2 and 3A, the collar feed tool 10' comprises a grip body 26' adapted to receive a collar supply magazine in the form of a clear plastic tube 32 having an interior channel 37 that is rectangular in cross-section. The tube 32 is long enough to hold from, for example, 50 to 200 collars in side-by-side adjacent relationship. The interior dimensions of the channel 37 are such as to provide a low-friction fit, but are tight enough to prevent the collars from tumbling or cocking while within the magazine. The magazine queue is sometimes referred to as a "supply queue" in this document.

Collars 28 are loaded into the magazine tube 32, after which the tube is connected to the tool 10 or 10' by insertion into a channel 39 and to a source of air pressure which urges the collar stack toward the tool. The source is preferably regulated so as to neither underdrive nor overdrive the collars toward the tool. The collars are pushed by air toward a transfer mechanism within the grip 26' as hereinafter described. A quick connect feature (not shown) may be used to join the magazine 32 to the tool in such a way as to hold it securely in use, but allow easy removal for reloading and service.

Figure 3A:
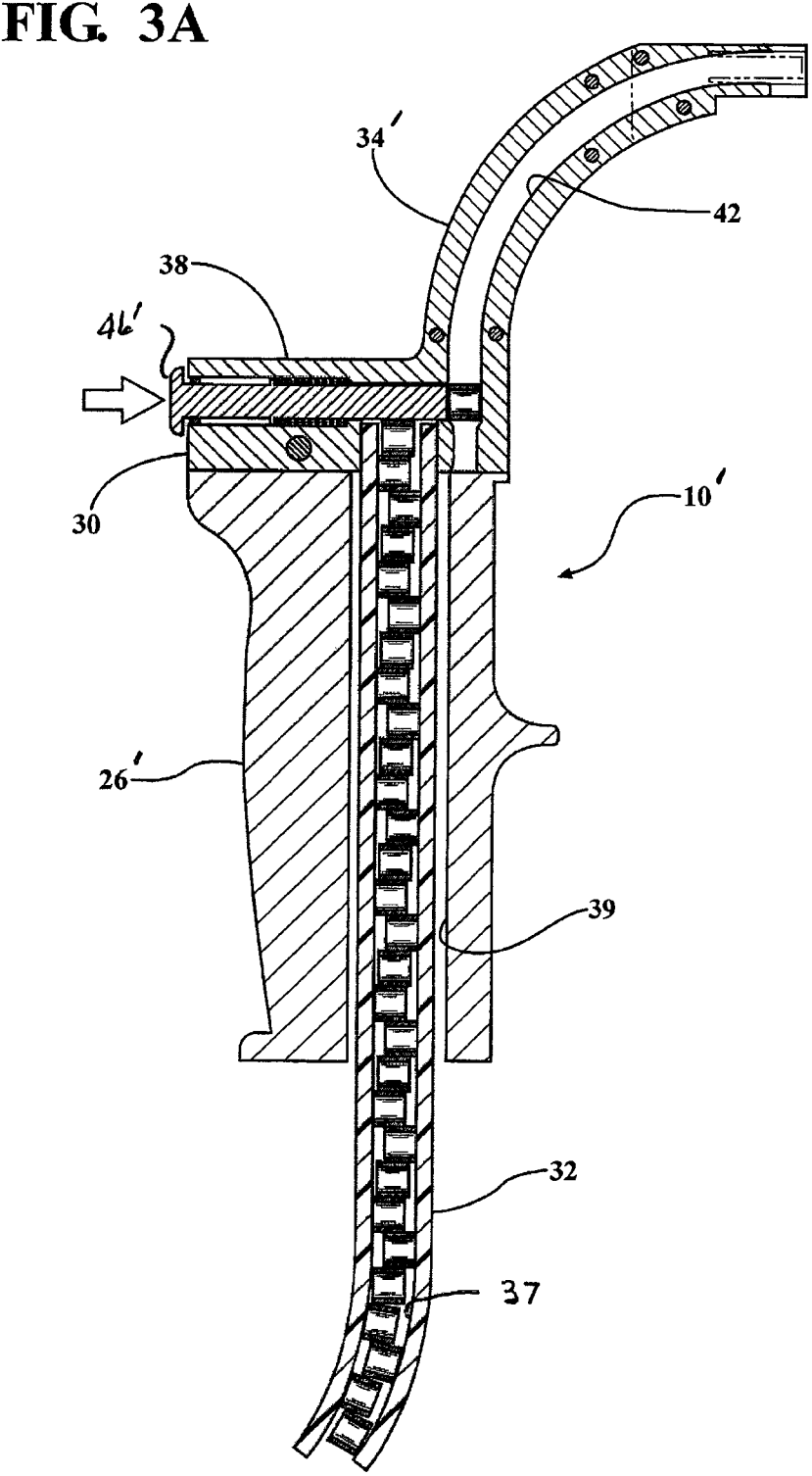
FIG. 3A is a cross-sectional view of the collar feeder of FIG. 2 showing the details of the trigger and slide mechanisms that are used to load the queue.
Figure 4A:
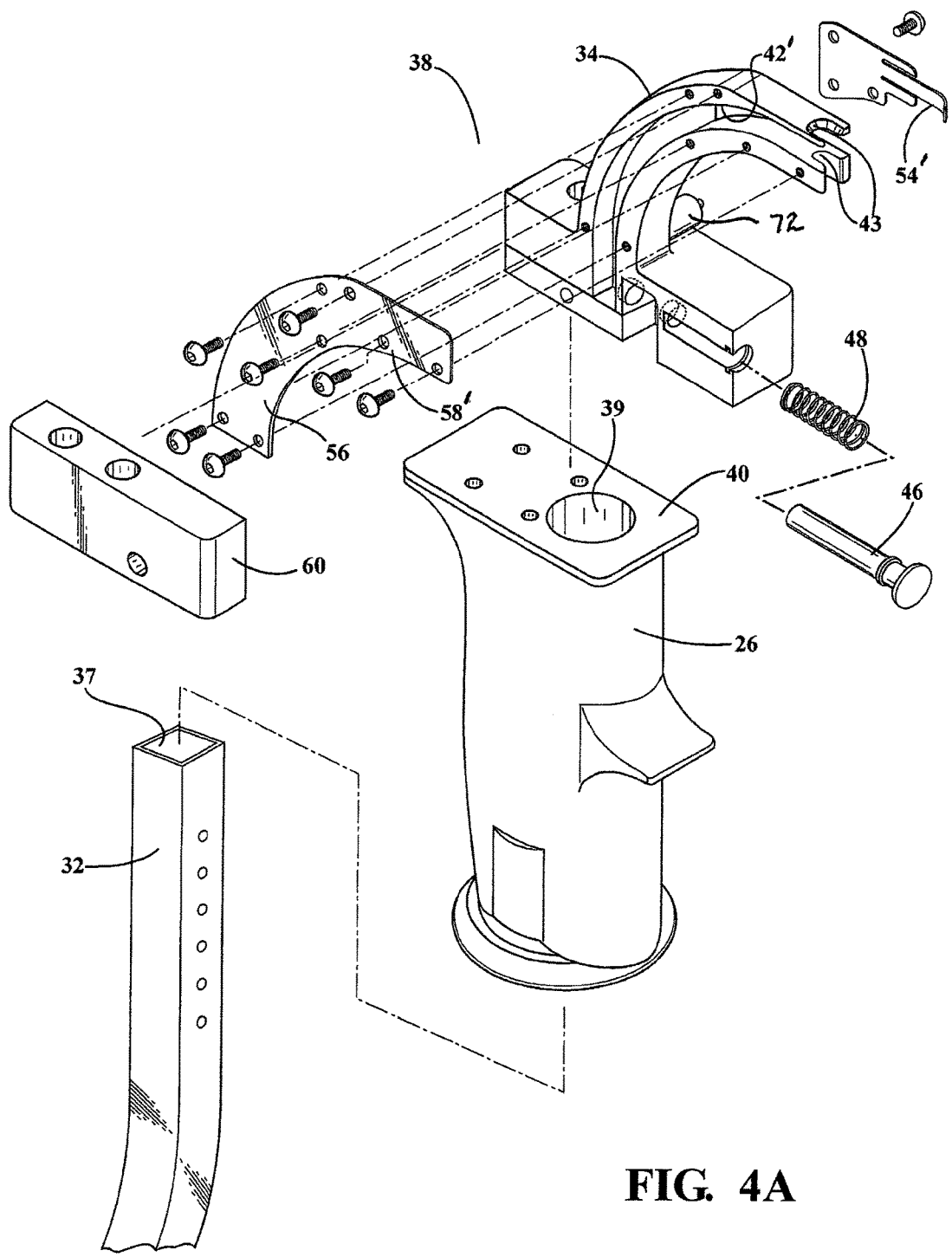
FIG. 4A is an exploded view of the feeder of FIG. 3B.
Figure 4B:
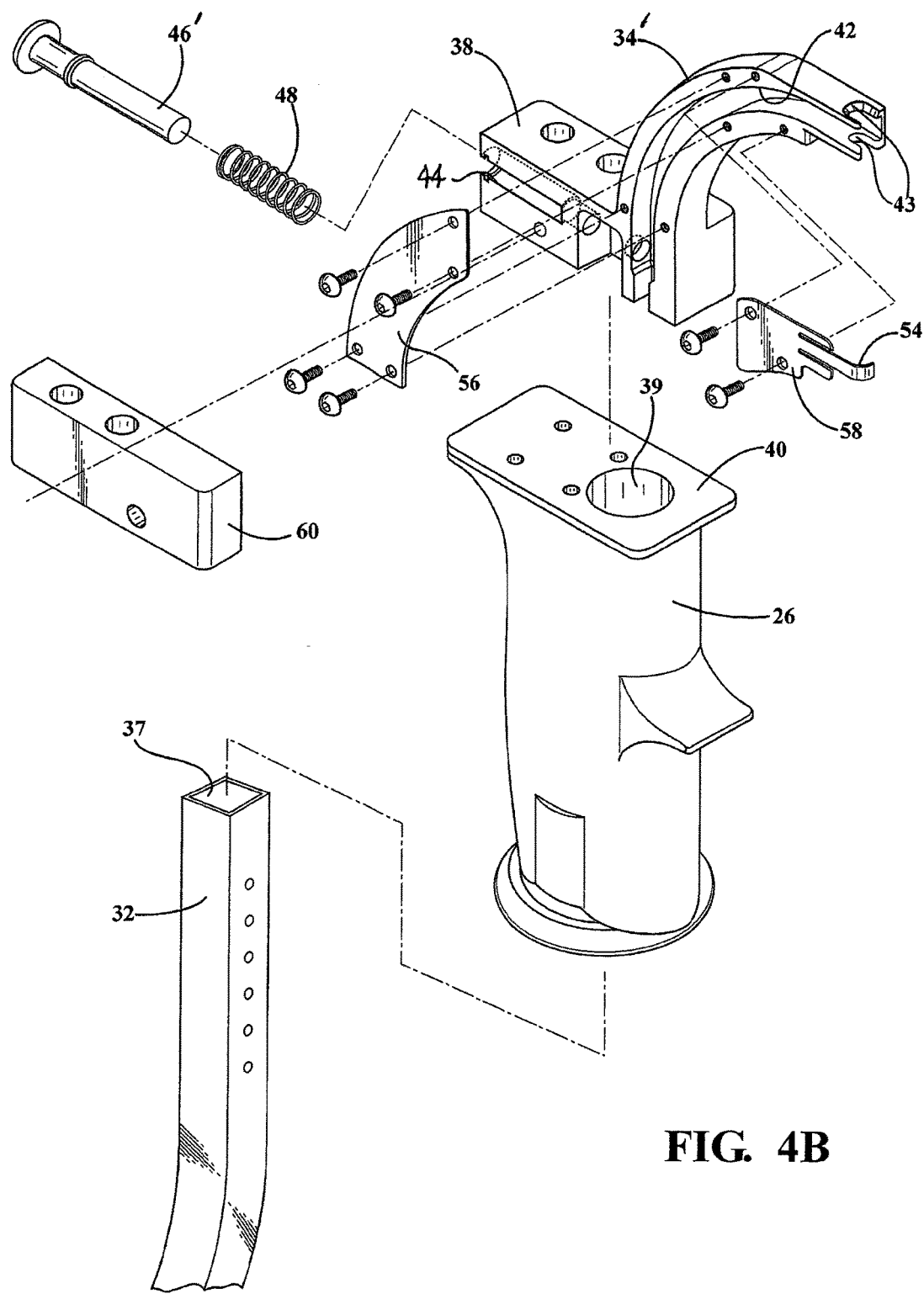
FIG. 4B is an exploded view of the feeder tool of FIG. 3A.

Referring to the embodiment of FIGS. 2, 3A and 4B, the tool 10' comprises an upper body 30 having two main sections: a transfer section 38 that bolts onto the grip 26', and an integral, curved end piece 34' having an interior channel 42 long enough to hold a working queue of 5 to 15 collars for a cycle of installations. Transfer section 38 has a slide-bolt passage 44 to receive a trigger/slidebolt 46' and a bias spring 48. Slidebolt 46' has an exposed end and provides a plunger-type trigger an operator can depress repeatedly to transfer collars from the magazine supply queue to the working queue within tool 10'. The passage 44 communicates with the magazine passage 39 and the end piece passage 42. The passages 39, 42 are offset from one another. Accordingly, the trigger/slidebolt 46' can transfer collars, one at a time, from passage 39 to passage 42 until the end piece 34 is loaded to the worker's satisfaction. The air pressure bleeding from magazine 32 into tool 10' moves each collar up to the end 43 of end piece 34'.

The number of collars needed to fill the working queue can vary, but can be chosen to match or slightly exceed the number of collars a worker can comfortably swage in a cycle of tool handling. This can be, for example, from 5 to 15 collars. After holding the feeder 10' in the left hand and the swaging tool in the right hand and raising both of them to a work position long enough to place and swage 8 or 10 collars, the typical worker is ready to lower the tools and relax his or her arms for a few moments. The working queue in the track piece 34' can be refilled during this rest period. These numbers are all given by way of example and are not limiting.

The slidebolt channel 44 is closed by a block 60. The channel 42 is covered by plates 56 and 58. Plate 56 can be metal or, preferably, a clear plastic that allows the worker to see how many collars are in the working queue. Plate 58 incorporates an integral retainer spring 54 that wraps around the open end of the piece 34' to prevent the escape of collars 28 until the worker pulls the tool 10' away from a lockbolt shank. Both plates 56, 58 are held in place by machine screws. The end of piece 34' is relieved as shown to expose the trough-bore of the collar in the presentation position.

To summarize, the magazine tube 32 provides a supply queue of collars 28 to be installed whereas the tool 10' can be loaded up with only as many collars as the worker is comfortable installing in a single cycle of tool manipulations. The trigger 46' is repeatedly pressed by the worker to transfer collars 28 from the supply magazine 32 to the working queue in the track piece 34' between each installation cycle or whenever he/she chooses. Air pressure urges the collars from the magazine toward the end of the tool 10'. The end piece 34' need not have the curved configuration illustrated, but can be designed to fit a particular job by presenting collars in an orientation that allows them to be transferred onto a lockbolt shank.

Figure 3B:
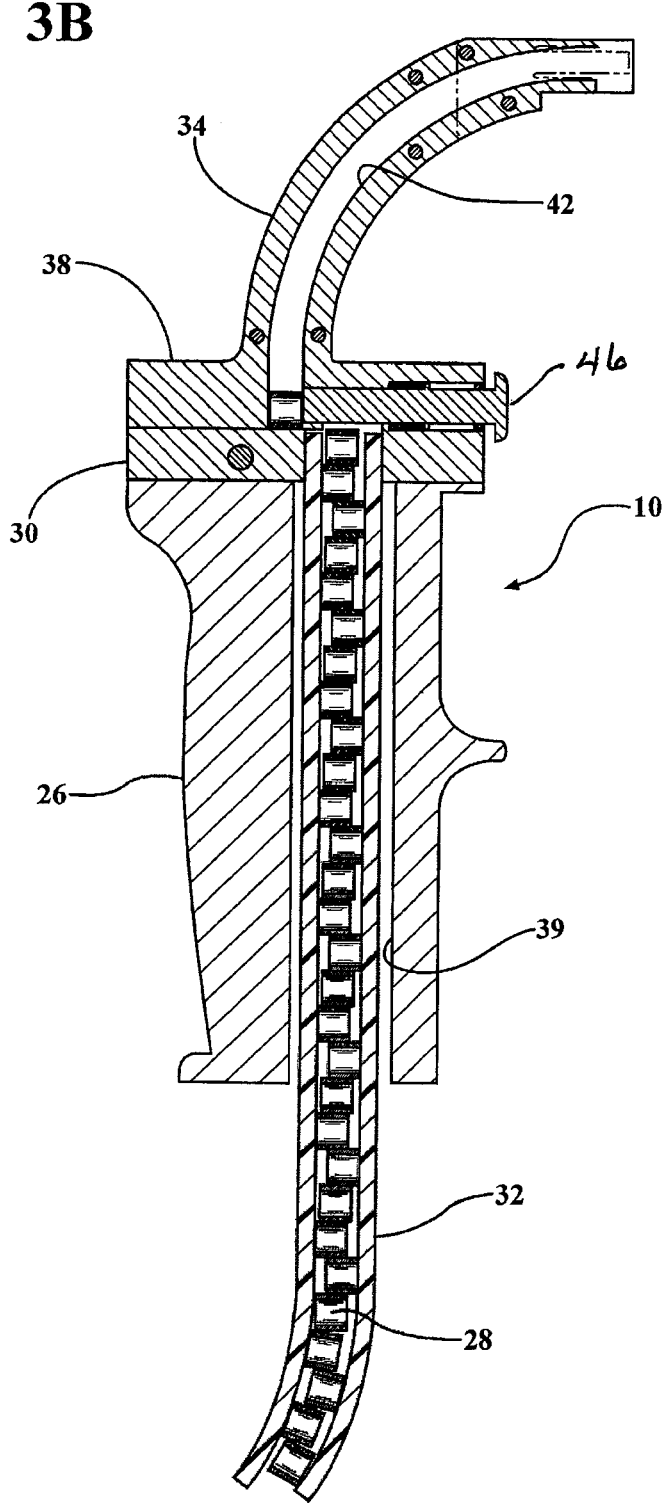
FIG. 3B is a cross-sectional view of the collar feeder of FIG. 1.

FIGS. 1, 3B and 4A show a different, preferred embodiment of the tool 10. The main difference in this embodiment is the relocation of the trigger 46 to the front of the tool where it can be operated by a worker's index finger. The trigger 46 still functions as a spring-based slide to move collars 28, one at a time, from the magazine channel to the tool queue 42 to load the end piece 34 as desired. As shown in FIG. 3B, the end piece 34 is reconfigured so the channel 42 is moved to the rear of the magazine channel 39.

Another set of differences between tools 10 and 10' is shown in FIG. 4A. The channel 42' is covered by a clear plastic plate 58' that extends the full length of the channel 42'. In addition, the spring plate 54' is moved to the back side of the end piece 34 so it does not prevent the operator from seeing if a collar is in the install position. A variable bleed regulator 72 may be placed on the back of the end piece 34' to adjust air pressure in the channel 42' separately from the pressure in the magazine 32. Alternatively, small bleed holes may be drilled into plate 58' to reduce air pressure in channel 42'.

The working end of track pieces 34 and 34' are notched to form top and bottom U-shaped openings 43. The top opening 43 may be chamfered as shown. The vertical height of channels 42 is such as to accommodate therebetween the collars 28 with the axis of the throughhole oriented in such a way as to extend through the U-shaped openings 43 in the end of channels 42. Plate 58 is trifurcated at the right end as shown in FIG. 4B to form the spring 54 that wraps around the side of a collar 28 at the top of the queue to prevent it from going beyond the presentation position at the end of the queue until the operator pulls the tool away from a lockbolt onto which a collar has been placed. The spring is flexible enough to allow this release function, but not so flexible as to allow collars to be blown out by air pressure alone. The springs 54 and 54' have enough flexibility along their length such that as the worker pulls the feeder tool 10 away from the lockbolt shank on which a collar 28 in the staging area has been placed, and the swaging tool 30 has been brought into place immediately below the collar, the springs 54 and 54' release the installed collar allowing the swaging tool 30 to be pushed fully into place around the collar to carry out the swaging operation. The next collar in the queue passage 42 moves into position at the end of piece 34 or 34'.

Figure 6:
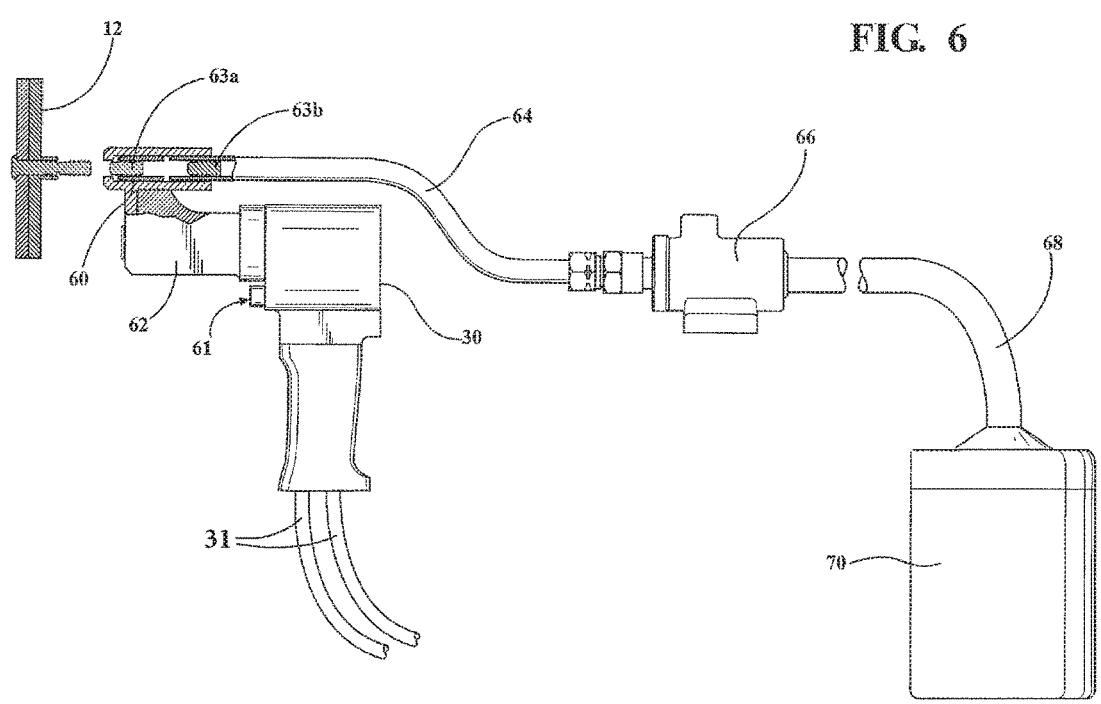
FIG. 6 is a schematic diagram of a swaging tool with a vacuum-operated pintail collection feature.

Looking to FIG. 6, the swaging/pintail fracturing tool 30 may take any of a variety of forms. A suitable ejector-type tool is available from Gage Bilt, Inc. of Clinton Township, Mich. and is identified as the GB204SHRB installation tool. The tool has air lines 31 connected to a power unit to operate a cylinder that controls a collet and a puller in body 62, a known manner by operating a trigger 61. Jaws 60 hold a broken-off pintail 63a until the tool 30 is applied to the next lockbolt. At this time, the entering pintail displaces the pintail 63a to the position of pintail 63b at which time it is pulled through conduit 64 by vacuum from a generator 66. The vacuumed pintail goes through the generator 66 and a second conduit 68 which empties into a container 70 that can be emptied from time to time.

During the process of collar installation described above, the pintails of the lockbolts 16 are fractured off of the shanks of the lockbolts 16 since they are not needed as part of the installed fastener. In normal circumstances, the fractured pintails are simply ejected through the tool 30. In the system of FIG. 7, the broken-off pintails are collected and deposited in a container 70 for disposal.

In summary, the feeder tool 10 or 10' allows a worker to perform a staging function for collars, one at a time, in such a way as to make it easy for the worker to locate those collars, one at a time, on the extending shanks of lockbolts 16. This eliminates the practice of hand-placing the collars on a number of lockbolt shanks prior to the application of a swaging tool. After the feeder 10 or 10' has been used to locate a collar onto a lockbolt shank, the swaging tool 30 is brought into place. The feeder tool 10 or 10' is withdrawn, the tool 30 is pushed further onto the shank and the collar is swaged onto the lockbolt shank as described above. The broken-off pintail goes into the ejection chamber of the tool 30, forcing the previously broken-off pintail through the tool and into the vacuum system where it is swept into the container 70 for safe and organized disposal at a later time. This process continues until the feeder queue in end piece 34 or 34' is empty. The operator then refills the queue with as many collars as he or she feels comfortable installing in a single cycle. The large magazine 32 provides a much longer queue, which the worker needs to refill only after a large number of cycles have been carried out. The worker may perform the foregoing process with tool 10 or 10' in one hand and tool 30 in the other hand. As each collar is put in place on a lockbolt shank, another collar takes its place in the presentation queue. The pintail in the tool causes the previously gripped pintail to be pushed into the vacuum tube 64 where it is taken to the container 70.

Referring to FIGS. 7, 8 and 9, a second embodiment of the collar feeder invention is described. The second embodiment comprises an assembly 100 having three main parts: a grip 102, a cylindrical cartridge 104 and a curved presentation piece 106 forming an end point with a spring that holds collars in a semi-exposed position where they may be placed onto a lockbolt shank and resiliently released onto the shank in the same manner as the end point device 34 functions in the previously described embodiment. Describing the assembly 100 in greater detail, the grip 102 is dimensioned and configured so as to be comfortably held in the hand of the operator. It has a flared skirt 107 holding part of a mechanism for releasably joining it to the cartridge 104 as well as a fitting 108 which is connectable to a supply of pressurized air as hereinafter described. No further detail is given with respect to part 106 since it may be identical to part 34 and/or 34' as previously described.

Figure 9A:
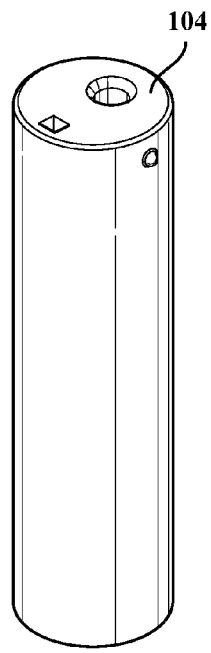
FIGS. 9A through 9E are various views of the feeder cartridge showing how collars are loaded into and taken out of the collar passage, how and where the air supply is connected, and how the cartridge and grip are interconnected.
Figure 9B:
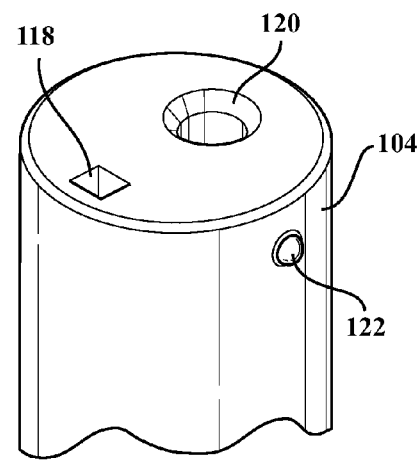
Figure 9D:
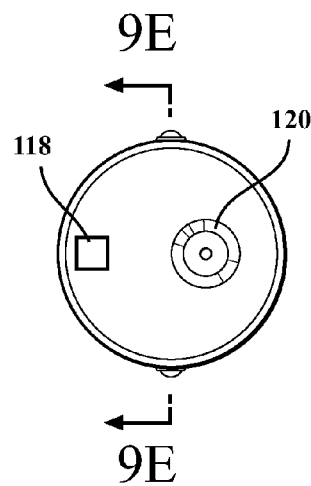
Figure 9C:
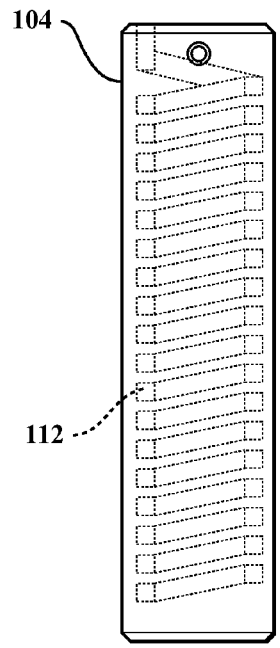
Figure 9E:
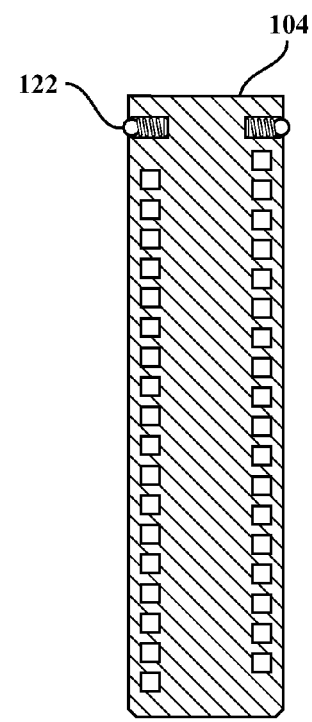

Looking to FIG. 8, the cartridge is shown to have a spiral shaped interior passage 112 which is dimensioned and configured to hold as many as 300 collars in substantially side-by-side axially parallel orientation. The collars are dropped into a hole 118 which is shaped to allow entry of the collars only in the desired orientation as best shown in 9B. As they are dropped in, the collars travel by gravity down the spiral path 112 until they essentially hit bottom and them begin to be stacked up toward the top of the cartridge. The cartridge 104 has a pair of spring biased detent balls 122 which are received in diametrically opposite cavities in the skirt 107 of the grip 102 so as to form a quick connect coupling. When coupled, the air supply inlet fitting 108 of the grip causes air to enter the top of passage 120 in the top end of the cartridge as shown in FIGS. 8B and 9D. The air pressure then travels straight down along the passage 114 shown in FIG. 8D where it interconnects with the bottom of the spiral passage thereby to urge the collars upwardly along the spiral passage and back out through the hole 118 and into the grip passage 102 as shown in FIG. 8D. From there, the collars travel up into the presentation device 106 where they form part of the immediate supply queue. As long as air is supplied, collars continue to move up the spiral passage in the supply cartridge and into the passage 102 in the grip and the curved passage in the presentation device 106 where they are held one at a time by the resilient spring end of the presentation part 106. As described above, collars may be easily and resiliently pulled out of the spring grip in the end of the presentation piece 106.

When collars are exhausted, the air supply is shut down or removed, collars are again loaded into the cartridge through the hole 118 where they travel down the spiral passage until the passage is again loaded to the extent deemed sufficient by the operator. In a commercial embodiment, we have found that the cartridge capable of holding approximately 300 collars is deemed sufficient, but larger and smaller cartridges can of course be designed and built.

It will be noted that while the first embodiment described above has a trigger mechanism for transferring cartridge from the supply queue to the presentation queue, the second embodiment does not have such a trigger mechanism. The absence of the trigger mechanism does not in any way impair the utilitarian value of the presentation device as collars are still presented one at a time in such a partially exposed fashion as to allow them to be readily placed onto the shank of the lock bolt regardless of the orientation of the lockbolt. The tool is then brought into engagement with the shank of the lockbolt, while the feeder mechanism is withdrawn, leaving the collar in place. The collar is thereafter swaged as is well known to those familiar with this technology.

While the invention has been described in connection with what are presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. For example, tools 10 and 10' may be reconfigured to align the magazine channel with the tool queue so that one trigger activation fills the entire tool queue, thus eliminating the need for repeated triggering action. In this case, the slidebolts simply block or unblock the route from magazine to hand tool as the worker wishes.

What is claimed is:

1. A device for feeding lockbolt collars to a presentation position for installation on lockbolts, one at a time, comprising:
    a hand-held grip having an elongate grip body, a curved presentation piece removably attached to the top of the grip body with an internal collar passage ending in said presentation position, and a flared bottom skirt with an air input port;
    said grip body having a collar passage therethrough in direct communication with the collar passage in the presentation piece; and
    a cylindrical collar cartridge connectable to the flared bottom of said grip body and having an air passage extending vertically through the cartridge, said air passage, when said cartridge is connected to said grip body, being in air flow communication with said air input port;
    said cartridge further having a top side which enters into said flared bottom with a spiral collar passage formed in said cartridge with a collar entry hole in said top side, the entry hole, when the cartridge is connected to the grip body, being in communication with the collar passage in said grip body; the entry hole being shaped to allow entry of collars only in a particular orientation;
    the spiral passage having a lower end in said cartridge in air flow communication with said vertically extending air passage such that collars, when the cartridge is connected to said grip body, are urged by air pressure admitted into said air passage via said air input port and from said air passage into said spiral passage lower end upwardly through the spiral passage into the grip body passage and from there into the presentation piece to the presentation position one at a time.

* * * * *